(12) United States Patent
Macele et al.

(10) Patent No.: US 11,742,670 B2
(45) Date of Patent: Aug. 29, 2023

(54) ENERGY TRANSMISSION SYSTEM AND WIND FARM

(71) Applicant: Siemens Gamesa Renewable Energy GmbH & Co. KG, Hamburg (DE)

(72) Inventors: Julien Macele, Hamburg (DE); Samuel-Matthias Wiktor, Ahrensburg (DE)

(73) Assignee: SIEMENS GAMESA RENEWABLE ENERGY GMBH & CO., KG

( * ) Notice: Subject to any disclaimer, the term of this patent is extended or adjusted under 35 U.S.C. 154(b) by 0 days.

(21) Appl. No.: 17/784,778

(22) PCT Filed: Dec. 9, 2020

(86) PCT No.: PCT/EP2020/085234
§ 371 (c)(1),
(2) Date: Jun. 13, 2022

(87) PCT Pub. No.: WO2021/122205
PCT Pub. Date: Jun. 24, 2021

(65) Prior Publication Data
US 2022/0352724 A1    Nov. 3, 2022

(30) Foreign Application Priority Data

Dec. 19, 2019  (EP) ..................................... 19218107

(51) Int. Cl.
*H02J 3/38* (2006.01)
*H01M 8/04082* (2016.01)
(Continued)

(52) U.S. Cl.
CPC ......... *H02J 3/381* (2013.01); *H01M 8/04186* (2013.01); *H01M 8/04201* (2013.01);
(Continued)

(58) Field of Classification Search
CPC ...... H02J 3/381; H02J 3/38; H02J 3/32; H02J 7/0013; H02J 7/00; H02J 2300/28;
(Continued)

(56) References Cited

U.S. PATENT DOCUMENTS

2011/0045332 A1   2/2011  Horne et al.
2019/0322189 A1   10/2019 Allison et al.

FOREIGN PATENT DOCUMENTS

WO    2012/094672 A2    7/2012
WO    2018/208143 A1    11/2018

OTHER PUBLICATIONS

International Search Report & Written Opinion for PCT/EP2020/085234 dated Mar. 30, 2021.

*Primary Examiner* — Robert L Deberadinis
(74) *Attorney, Agent, or Firm* — Schmeiser, Olsen & Watts LLP

(57) ABSTRACT

An energy transmission system is provided for a power generation plant including plural distributed power generation devices and a flow battery system that includes plural charging stacks including electrochemical flow cells, wherein each charging stack is associated with one or a group of the power generation devices of the power generation plant and wherein each charging stack is configured to receive electrical energy produced by the associated power generation device or group of power generation devices and to energize an electrolyte of the flow battery system by the received electrical energy; a central storage unit configured to store the electrolyte of the flow battery system; a discharging stack including electrochemical flow cells, wherein the discharging stack is configured to extract electrical energy from the electrolyte and to provide the electrical energy to a power grid. A wind farm including wind turbines and including such energy transmission system is further provided.

17 Claims, 5 Drawing Sheets

(51) Int. Cl.
*H01M 8/18* (2006.01)
*H02J 7/00* (2006.01)
*H01M 8/04186* (2016.01)
*H02J 3/32* (2006.01)

(52) U.S. Cl.
CPC ............... *H01M 8/188* (2013.01); *H02J 3/32* (2013.01); *H02J 7/0013* (2013.01); *H01M 2250/10* (2013.01); *H02J 2300/24* (2020.01); *H02J 2300/28* (2020.01)

(58) Field of Classification Search
CPC ........... H02J 2300/24; H01M 8/04186; H01M 8/04201; H01M 8/188; H01M 2250/10; H01M 8/4082; H01M 8/18
See application file for complete search history.

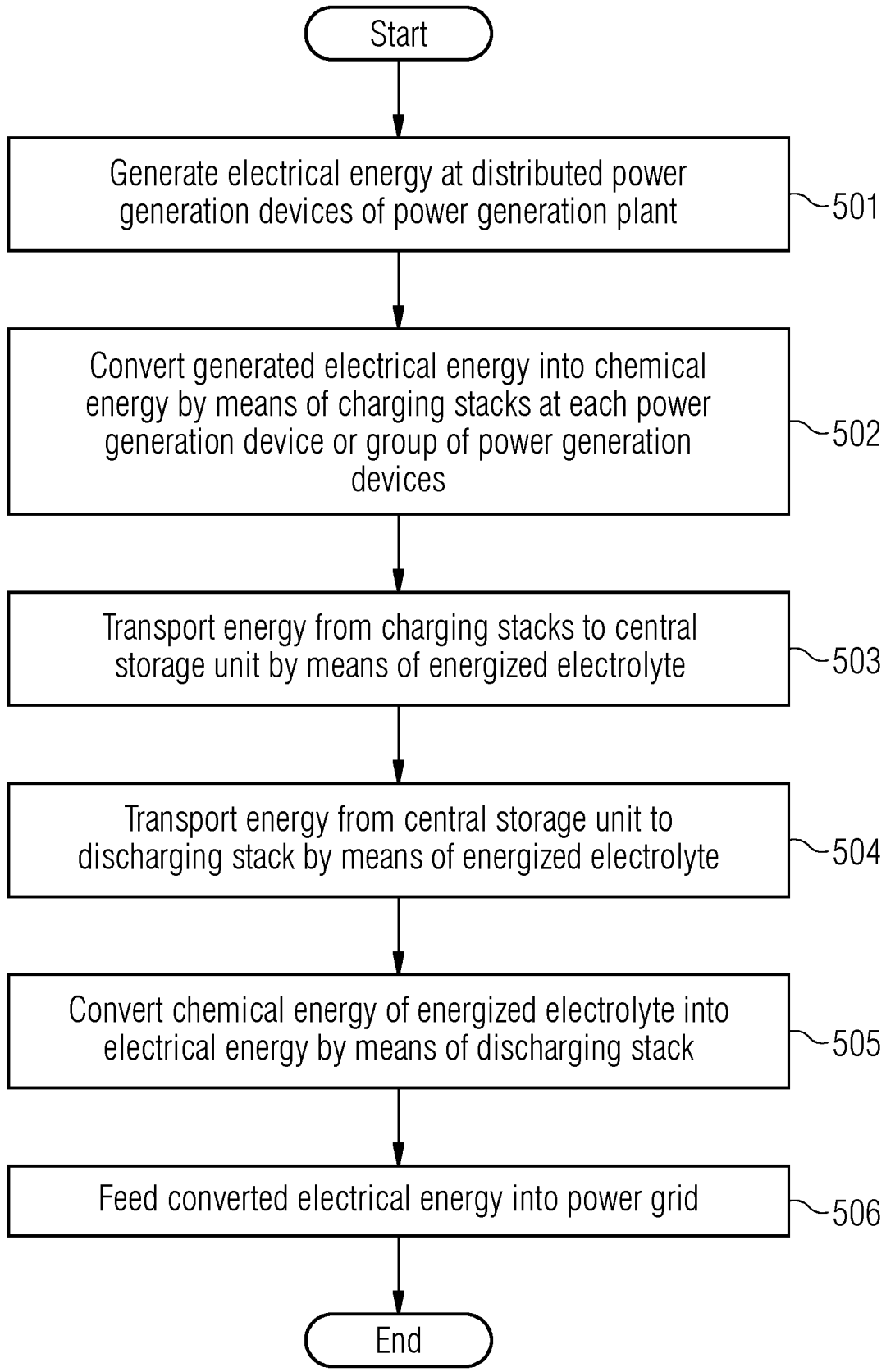

ENERGY TRANSMISSION SYSTEM AND WIND FARM

CROSS-REFERENCE TO RELATED APPLICATIONS

This application claims priority to PCT Application No. PCT/EP2020/085234, having a filing date of Dec. 9, 2020, which claims priority to EP Application No. 19218107.1, having a filing date of Dec. 19, 2019, the entire contents both of which are hereby incorporated by reference.

FIELD OF TECHNOLOGY

The following relates to an energy transmission system for a power generation plant that comprises plural distributed power generation devices, wherein the energy transmission system includes a flow battery system. The following further relates to a method of operating an energy transmission system for such power generation plant and to a wind farm.

BACKGROUND

Strategies for sustainable energy generation generally rely on renewable power plants, among them wind energy and solar energy plants. In such plants, energy is usually generated at a plurality of individual distributed power generation devices, such as individual wind turbines or solar modules (also termed photovoltaic, PV, modules). At a variable speed wind turbine, the generated electrical power is converted to a frequency corresponding to that of the power grid into which the generated power is to be fed, such as the 50 Hz or 60 Hz utility grid. Wind turbine transformers are employed to transform the electrical energy to the desired voltage level. After conversion and transformation, the electrical power is transmitted to a substation of the respective wind farm by a local grid (collector grid), at which the power is fed into the power grid.

Several strategies have been devised how to handle the active and reactive power demands of the power grid by respective control of the wind turbines, and how to continue operation of the wind turbines when faults occur on the power grid, resulting in respective transients. In these conventional systems, there are problems associated with the loss of energy due to the sequential conversion and cabling. The losses can add up to about 10% of the produced energy. Furthermore, technically complex and cost-intensive control strategies and equipment have to be provided to deal with the active and reactive power demands of the grid and to implement features such a LV and HV ride through capability.

Some power plants proposed in the conventional art have employed storage systems, which can for example be co-located to the power plant and share the same grid connection point. Such storage systems can be used as energy buffer, i.e., they can store excess energy produced by the power plant, e.g., by the wind turbines, and they can provide additional energy to the grid when there is a high-power demand. An example of such storage device is described in the document US 2011/0045332 A1. Although such systems may have some benefits, they cannot resolve all of the above outlined problems.

A further example is described in document US 2019/0322189 A1, wherein a flow battery system is provided to buffer energy from the power grid in order to be able to meet the high energy demand occurring when charging plural electrical vehicles at the same time at a charging station.

The document WO 2012/094672 A2 describes a redox flow battery system that is used to buffer energy generated by an energy source, wherein tank separators are provided to avoid mixing between electrolyte liquids.

It is desirable to avoid at least some of the losses associated with the conversion and transmission of electric power in such power plant. Furthermore, it is desirable to facilitate the compliance with the grid code and in particular to provide the required active and/or reactive power to the power grid. It is further desirable to allow renewable energy sources to produce electrical energy when and in the amount in which the renewable energy is available.

SUMMARY

An aspect relates to electrical energy produced by a power generation plant, in particular a renewable plant, to the power grid. It is in particular desirable to improve the interaction between the power generation devices and the grid and to avoid electrical losses due to electrical power conversion.

According to an embodiment of the invention, an energy transmission system for a power generation plant that comprises plural distributed power generation devices is provided. The energy transmission system includes a flow battery system that comprises plural charging stacks including electrochemical flow cells. Each charging stack is associated with one or a group of the power generation devices of the power generation plant. Each charging stack is configured to receive electrical energy provided by the associated power generation device or group of power generation devices and to energize an electrolyte of the flow battery system by the received electrical energy. The flow battery system further comprises a central storage unit configured to store the electrolyte of the flow battery system and a discharging stack including electrochemical flow cells. The discharging stack is configured to extract electrical energy from the electrolyte and to provide the extracted electrical energy to a power grid. The flow battery system further includes a first set of flow conduits configured to provide a flow connection from the plural charging stacks to the central storage unit in order to provide transmission of energy produced by the power generation devices to the central storage unit by the energized electrolyte and a second set of flow conduits that provide a flow connection from the central storage unit to the discharging stack in order to provide transmission of energy from the central storage unit to the discharging stack by the energized electrolyte.

The energy produced by the power generation devices may thus fully be supplied to the power grid via the flow battery system and in particular the electrolyte, i.e., there is a full electrical decoupling between the power generation part of the power generation plant and the feed-in part at which the electrical energy is fed into the power grid. Accordingly, the production and distribution of electrical energy can be fully decoupled. By the central storage unit and the discharging stack, the system allows the providing of active and reactive power to the grid as desired, so that the system can provide a base load power and can follow a power demand curve of the grid. Furthermore, losses due to conversion and further cable losses due to the transport of electrical energy can be avoided. For example, the electrical energy produced by the generator of a wind turbine only needs to be rectified and provided to the associated charging stack, or the electrical energy produced by a photovoltaic module may only need to undergo minor DC-to-DC conversion or may directly be provided to the associated charging stack. A higher efficiency may thereby be achieved. Also, in such system, the discharging stack can certainly be operated to also charge the flow battery system from the power grid, so that it is capable of absorbing excess power present on the power grid and to provide grid stabilization.

On the other hand, such system provides a simple allowing a black-starting of a wind turbine by the flow battery system, since the charging stack associated with the respective wind turbine can also be operated in reverse so as to provide electrical energy to the wind turbine for black-start. Furthermore, fluctuations in the power production by the respective power generation devices are fully absorbed by the flow battery system. Such power fluctuations are accordingly not forwarded to the power grid. Furthermore, since the produced electrical power is directly provided to the associated charging stack, no transformation of the electrical power is required, for example in a wind turbine. No wind turbine transformer is therefore needed. The voltage levels present in the power generation devices can thereby be reduced, which not only simplifies the required protection and safety measures, but also simplifies maintenance staff training. Due to the decoupling between the power generation devices and the grid, the power generation devices do not need to be operated in such a way that the requirements of the grid are fulfilled, which can result in a higher energy yield, in particular as the voltage level and frequency of the generated electrical power do not need to be matched to respective grid requirements.

The flow battery system may in particular be a redox flow battery system, and the flow cells may in particular be redox flow cells. Such redox flow system does not need a separate converter system. Furthermore, compared to lithium ion-based solutions, the battery management system of such redox flow battery system is less complex, in particular as no air-conditioning, no fire-extinguishing systems and other safety systems are required. There is a lower pollution risk since organic electrolytes can be used that are non-toxic. Furthermore, standard components can be used, such as concrete basins generally employed for agricultural purposes, and standard pumps and piping can be used for the central storage unit and for the flow conduits. Conventional tank solutions as commonly used in the petrol industry may likewise be used. The pipes that can be used for providing a flow connection for the electrolyte are furthermore significantly cheaper than medium voltage cabling required in conventional power plants. Furthermore, such distributed redox flow battery in which the charging stacks are directly associated with the respective power generation devices reduces the number of components compared to conventional systems in which a battery is for example coupled to the grid connection point. Such conventional systems not only require the power conversion and transformation equipment of conventional renewable power plants, but additionally require respective conversion and transformation equipment for the attached battery system, and also require respective communication and control systems that manage the power generation and storage.

Providing a central storage unit which can comprise centralized tanks for storing the electrolyte further reduces the investment costs compared to conventional systems where several small tanks are distributed across the power plant. The central storage unit includes two or more tanks (or reservoirs) each holding a volume of the electrolyte. The setup of the energy transmission system further allows an optimization of the charging stacks for performing energization of the electrolyte, i.e., for performing charging of the flow battery system, as they will operate in a charging mode for most of their operation time. Similarly, the discharging stack can be optimized for converting chemical energy of the electrolyte into electrical energy, as it will operate in the respective discharge mode for most of its time.

Such energy transmission system is in particular suitable for weak grids, since it does not forward fluctuations in the energy production to the grid and it further naturally includes a black-start capability. It is also possible to retrofit existing power generation plants with a respective energy transmission system, since the power generation devices of such plant can be equipped with respective charging stacks. It is further relatively simple and cost-efficient to implement a central storage unit and a discharging stack in such existing plant. Accordingly, several advantages are achieved with such energy transmission system.

A power grid may a public power grid or utility grid, yet it is not restricted to such. The power grid may also be a grid providing electrical connections to one or more consumers, for example a small island grid or the like.

How the electrolyte is energized certainly depends on the type of flow battery system employed. For example, in a redox system, different oxidation states may be used to energize the electrolyte, which can include an anolyte and a catholyte. Energy may thus be stored in the electrolyte by changing the oxidation state of the catholyte and of the anolyte. Redox flow batteries generally involve oxidation and reduction processes of the respective anolyte and catholyte. In general, the energized electrolyte stores energy in form of chemical energy. Energization thus refers to a higher energy state of the electrochemical system.

In an embodiment, the plural charging stacks are arranged at the power generation plant. The central storage unit and the discharging stack may be arranged remote from the power generation plant. This may be particularly beneficial if a larger distance lies between the location of the power generation devices and the grid connection point.

The plural charging stacks may be distributed across the power generation plant and may be arranged at or inside the associated power generation devices. The electrical energy can thus be converted into chemical energy of the energized electrolyte at the location of the respective power generation device, so that less conversion equipment is required at the power generation device and electrical losses due to transmission via power cables are reduced. A charging stack associated with one power generation device may for example be arranged at (e.g. next to) or inside (e.g. inside a tower or housing) the power generation device, and a charging stack associated with a group of power generation devices may for example be arranged at the location of the power generation devices of the group, e.g. at a central location, or at (e.g. next to) one of the power generation devices of the group, or may be arranged inside a power generation device of the group. As an example, a container comprising the charging stack may be placed directly adjacent or next to a wind turbine or a group of photovoltaic modules.

At least one, each of the plural charging stacks may be arranged inside a power generation device. The charging stack may thus be protected from the environment while at the same time moving closer to the point of electrical power generation. For example, the power generation devices may be wind turbines, and at least one or each of the plural charging stacks may be arranged inside a tower of the associated wind turbine. The space available in such wind turbine tower can thus be used efficiently, and an efficient protection of the charging stack is provided, in particular in offshore environments.

The power generation plant may be an offshore power generation plant. The plural charging stacks may be arranged offshore at the offshore power generation plant and the discharging stack may be arranged onshore. In such configuration, it is not necessary to provide medium voltage or high-voltage cabling in the form of subsea cables between the offshore power generation plant, such as an offshore wind farm or tidal plant, and the onshore site where the power plant is connected to the grid. Rather, it is sufficient to provide the first or second set of flow conduits between the offshore power plant and the onshore site. The central storage unit may be arranged onshore or in proximity to the shore, or it may be arranged offshore at the site of the offshore power generation plant. The high costs and technical challenges associated with the laying of subsea cables may thus be avoided.

In such embodiment, at least one, all of the charging stacks may be arranged on an offshore platform. There may accordingly be a central offshore platform for the respective charging stacks where the energy conversion takes place. Additionally, or alternatively, the charging stacks may be provided at or inside the power generation devices, as outlined above. For example, for one or more power generation devices, the charging stack is provided on the offshore platform and for one or more power generation devices, the charging stack is provided at or inside the respective device. The number of pipes for the electrolyte towards the individual power generation devices may thus be reduced.

The first set of flow conduits may provide a main transmission route, the only transmission route, for energy produced by the power generation devices of the power generation plant to the power grid. The energy transmission system does accordingly not act as a buffer, but it actually transfers the electrically energy generated by the power generation devices to the grid. In particular, the 'only route' means that there is no parallel route present via which the electrical energy produced by the wind turbines is fed into the power grid, such as via electrical connections, in particular a collector grid.

A main transmission route may for example be defined as transporting at least 50% of the power produced by the respective power generation device, at least 70%, 80%, 90% or more of the produced power.

The electrolyte may comprise an anolyte and a catholyte. The central storage unit may comprise at least a first tank holding the anolyte and a second tank holding the catholyte. It should be clear that these tanks may be spatially separate, or may be combined into a common tank structure. The first and second tanks accordingly store the energy of the battery system. It should further be clear that plural of such tanks may be provided, and that the first and second tanks may be separated into tanks for energized anolyte/catholyte and de-energized anolyte/catholyte, for example by providing a respective separation wall in the respective tank, or by providing separate tanks.

Central in this respect means that the first and second tanks holding the catholyte and the anolyte are grouped together at a predetermined location, and that they are not distributed among the power generation devices.

In an embodiment, the central storage unit comprises pumps to pump the electrolyte from the central storage unit to the plural charging stacks. It may further include pumps to pump the electrolyte from the central storage unit to the discharging stack. The central storage unit may further comprise photovoltaic modules coupled to the pumps to provide electrical energy for driving the pumps. The self-consumption of energy of the flow battery system may thus at least partially be covered by the respective photovoltaic modules. The modules may for example be attached to the first and/or second tanks to make use of the respective available area.

The first set of conduits may include plural conduits configured to distribute electrolyte to and collect energized electrolyte from the plural charging stacks associated with the power generation devices, and a transmission conduit configured to transport the collected energized electrolyte to the central storage unit and to provide a supply with de-energized electrolyte from the central storage unit for distribution to the charging stacks. A collection unit (e.g., a manifold) or a collection conduit (e.g., pipe) may for example be provided into which the flow conduits from the individual charging stacks lead (e.g., one for collecting the anolyte and one for collecting catholyte) and to which the transmission conduit is connected. A respective distribution unit (manifold) or distribution pipe may further be provided from which the (de-energized) electrolyte received from the transmission conduit is distributed to the plural charging stacks (e.g., one for distributing the anolyte and one for distributing the catholyte). The transmission conduit may include a supply conduit and a return conduit for the electrolyte, in particular a single supply and return conduit (pipe) for the catholyte and a single supply and return conduit (pipe) for the anolyte. Accordingly, only four pipes may need to be provided to transport the energy produced by the power plant (in particular by the distributed power generation devices) from the site of the plant (e.g., an offshore location) to the site of the central storage unit (e.g., an onshore location) and for returning de-energized electrolyte. It should be clear that further pipes can be provided, e.g., for increasing the flow capacity of the transmission conduit.

In an embodiment, the energy transmission system may further comprise a controller, the controller being configured to control the feeding of electrical power into the power grid via the discharge stack. The controller may furthermore be configured to control the energy transmission system so as to enable the flow battery system to absorb electrical power from the grid via the discharging stack. Accordingly, the flow battery system may absorb peaks on the power grid and may contribute to grid stabilization. In particular, as excess energy is being fed into the grid, and the grid frequency rises, this may be used as a trigger by the energy transmission system to absorb energy from the grid and to thereby stabilize the grid. The controller may likewise provide additional electrical power into the grid in case of under-frequency.

In an embodiment, the energy transmission system further comprises an inverter coupled to the output of the discharging stack to convert DC electrical power supplied by the discharging stack into AC electrical power. The energy transmission system may furthermore include a transformer configured to adapt the voltage of the AC electrical power to a voltage suitable for transmission via the power grid. The energy transmission system thus only requires a reduced number of components for feeding electrical power into the power grid.

The flow conduits may be provided by pipes, in particular by steel pipes or plastic pipes.

The power generation plant may be a wind farm, and the power generation devices may be wind turbines (also termed wind turbine generators, WTGs). In other embodiments, the power generation plant may be a photovoltaic plant, and the power generation devices may be photovoltaic modules. For a wind farm, each wind turbine is associated with one charging stack, whereas for a photovoltaic plant, a group of photovoltaic modules is associated with one charging stack. It should be clear that one charging stack may be formed by a cascade of stacks of electrochemical cells to achieve the desired capacity.

The electrolyte may be an organic electrolyte. It may for example be a saltwater-based electrolyte, e.g., it may use saltwater as a solvent and include organic storage substances.

According to a further embodiment of the invention, a wind farm comprising plural power generation devices in form of wind turbines is provided. The wind farm comprises an energy transmission system having any of the above-described configurations.

Each wind turbine may comprise a generator and a rectifier coupled to the generator. The wind turbine may be configured to provide electrical energy generated by the generator via the rectifier to the associated charging stack. In particular, the electrodes of the charging stack may be directly connected to the rectifier of the associated wind turbine. Again, the number of components required for power conversion and transformation can thereby be reduced, resulting in an energy and cost-efficient system. In particular, no inverter and transformer are required. It should be clear that embodiments are also conceivable in which further or different components are used to provide the electrical power produced by the generator to the charging stack, such as additional components for smoothing the converted DC voltage or converters more complex than a simple or controlled rectifier, such as a power electronic converter that can be operated both as rectifier and inverter to allow power flow in both directions.

According to a further embodiment, a method of operating an energy transmission system for a power generation plant that comprises plural distributed power generation devices is provided. The energy transmission system includes a flow battery system, in particular a redox flow battery system. The method comprises the receiving of electrical energy at plural charging stacks that include electrochemical flow cells, wherein each charging stack is associated with one or a group of the power generation devices of the power generation plant. The electrical energy is received by each charging stack from the associated power generation device or group of power generation devices. The method includes energizing, by the charging stacks, an electrolyte of the flow battery system by the received electrical energy. The method further comprises transmitting the energy produced by the power generation devices to a central storage unit by flowing the energized electrolyte through a first set of flow conduits that provide a flow connection from the plural charging stacks to the central storage unit, wherein the electrolyte is stored at the central storage unit, and transmitting energy from the central storage unit to a discharging stack by flowing energized electrolyte through a second set of flow conduits that provide a flow connection from the central storage unit to the discharging stack. The method further includes extracting the electrical energy from the electrolyte by the discharging stack that includes electrochemical flow cells and providing the extracted electrical energy to a power grid. By such method, advantages similar to the ones outlined further above with respect to the energy transmission system may be provided.

The method may in particular be performed by an energy transmission system having any of the above-described configurations. The method may include any method steps described with respect to such energy transmission system herein above or further below. It should further be clear that the energy transmission system may be configured to implement the inventive method in any of the configurations described herein.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 5 is a flow diagram illustrating a method of operating a transmission system according to an embodiment of the invention.

DETAILED DESCRIPTION

Figure 1:
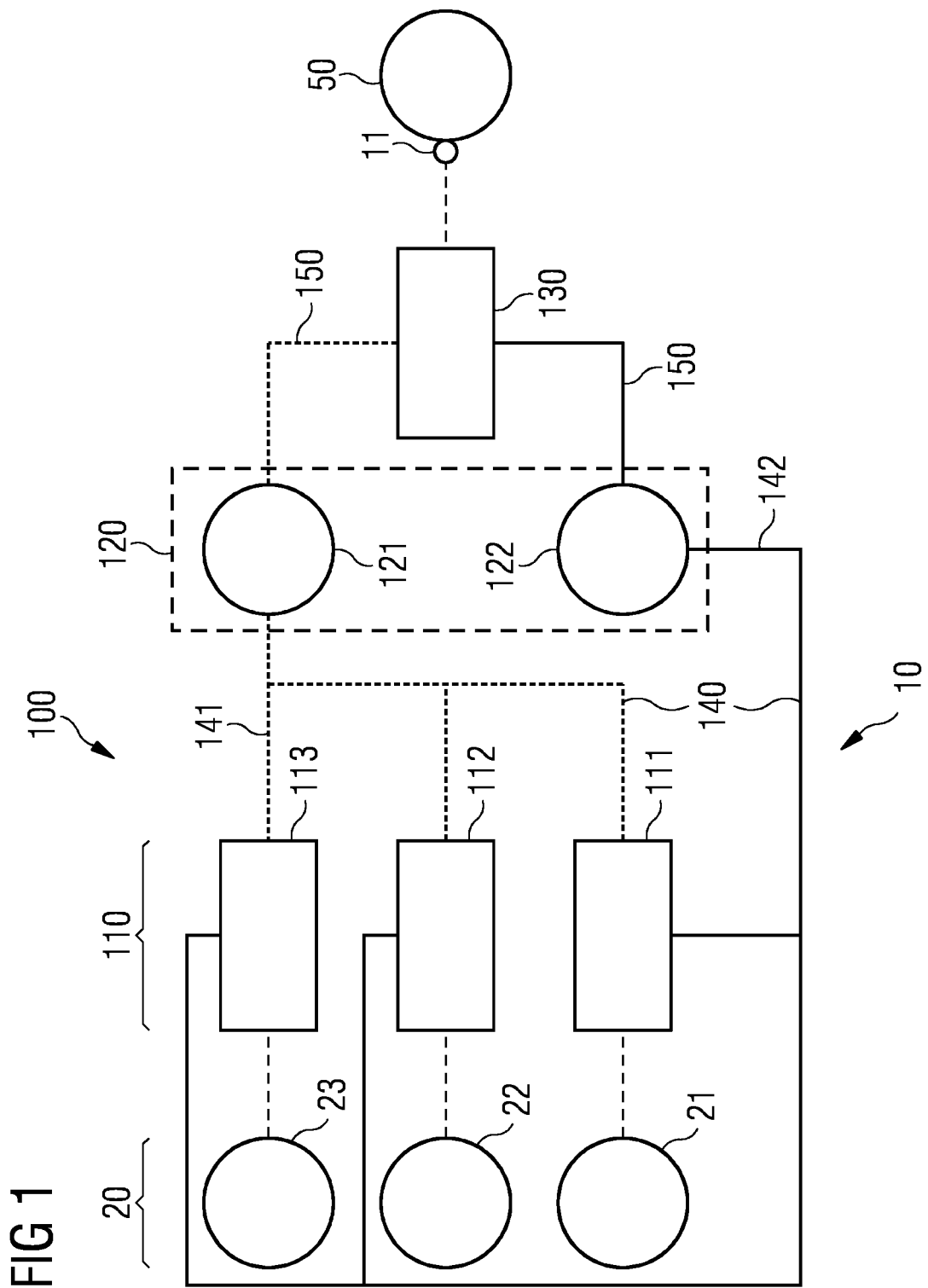
FIG. 1 is a schematic drawing showing an energy transmission system according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically illustrates a power generation plant 10 including plural power generation devices 20, wherein the exemplary devices 21, 22 and 23 are illustrated in FIG. 1. The power generation plant 10 is connected to the power grid 50 at a grid connection point 11, which may also be a point of common coupling (PCC).

FIG. 1 further illustrates an energy transmission system 100 according to an embodiment of the invention, wherein the energy transmission system is integrated with the power generation plant 10. The energy transmission system 100 includes plural charging stacks 110, wherein each charging stack is associated with one or more of the power generation devices 20. In the example of FIG. 1, the charging stacks 111, 112 and 113 are associated with the power generation devices 21, 22, and 23, respectively. 'Associated with' means that they are electrically connected only to a power generating component, such as a generator of a wind turbine or a photovoltaic cell of a photovoltaic module, of the respective associated power generation device (i.e. a charging stack is not electrically connected to other power generation devices not associated with this charging stack) and/or are located adjacent the respective power generation device or are integrated therein, for example in the tower of a wind turbine.

Each power generation device is thus associated with exactly one charging stack, and plural power generation devices may be associated with the same charging stack 110, for example one row of photovoltaic modules may be associated with the same charging stack 110. Charging stacks 111, 112 and 113 are thus separate stacks provided at different locations distributed across the power generation plant 10.

The energy transmission system further includes a central storage unit 120 that includes the anolyte tank 121 and the catholyte tank 122. A first set of flow conduits 140 provides a flow connection between each of the charging stacks 110 and each of the storage tanks 121, 122. The storage tanks 121, 122 are provided at a centralized location of the power plant 10 and they are provided in proximity of each other. It should be clear that for the anolyte and the catholyte, plural storage tanks may be provided, for example when a particularly large amount of electrolyte needs to be provided for a large power plant. Respective pumps 160 (not shown in FIG. 10) are furthermore provided that pump the anolyte and the electrolyte towards the charging stacks 110.

The energy transmission system furthermore includes a discharging stack 130 that similarly to the charging stacks 110 includes a stack of electrochemical flow cells. The second set of flow conduits 150 provides a flow connection from each of the storage tanks 121, 122 to the discharging stack 130. Again, respective pumps are provided that pump the anolyte and the catholyte to the discharging stack 130. The discharging stack 130 is electrically coupled to the grid connection point 11 and thus to the power grid 50. Intervening components of the coupling, such as a converter and a transformer, are not shown in FIG. 1 (see FIG. 3).

Depending on the power requirements, it should be clear that more than a single discharging stack 130 may be provided, for example a cascade of stacks or a plurality of parallel stacks may be provided.

In operation, the power generation devices 20, which are renewable power generation devices, generate electric energy that is transmitted to and received by the respective associated charging stack 110. Application of the electrical energy to the electrodes of the charging stacks causes an electrochemical reaction in the cells of the charging stacks, in which the electrical energy is converted into chemical energy, for example by changing the oxidation state of the anolyte and the catholyte. The energized electrolyte, in particular the anolyte and the catholyte, are then transported back into the storage tanks 121, 122, so that the energy produced by the power generation devices 20 is stored in the central storage unit 120 (in chemical form). Central storage unit 120, first flow connections 140 and the charging stacks 110 thus effectively form a charging circuit of a flow battery.

In a discharging circuit, the energized electrolyte is provided via the second flow connections 150 to the discharging stack 130. Again, in an electrochemical reaction, the electrolyte in the flow cells of the discharging stack 130 undergoes a reaction in which the chemical energy is released as electrical energy on the electrodes of the discharging stack 130, for example by the anolyte and the catholyte undergoing changes in the oxidation state of the respective reactive component. The released electrical energy can then be converted to the desired frequency and voltage and can be fed via a grid connection point 11 into the power grid 50.

The energy transmission system thus includes a flow battery that has a charging circuit provided by charging stacks 110, the first set of flow conduits 140 and the central storage unit 120, and a discharging circuit formed by the central storage unit 120, the second set of flow conduits 150 and the discharging stack 130.

Figure 4:
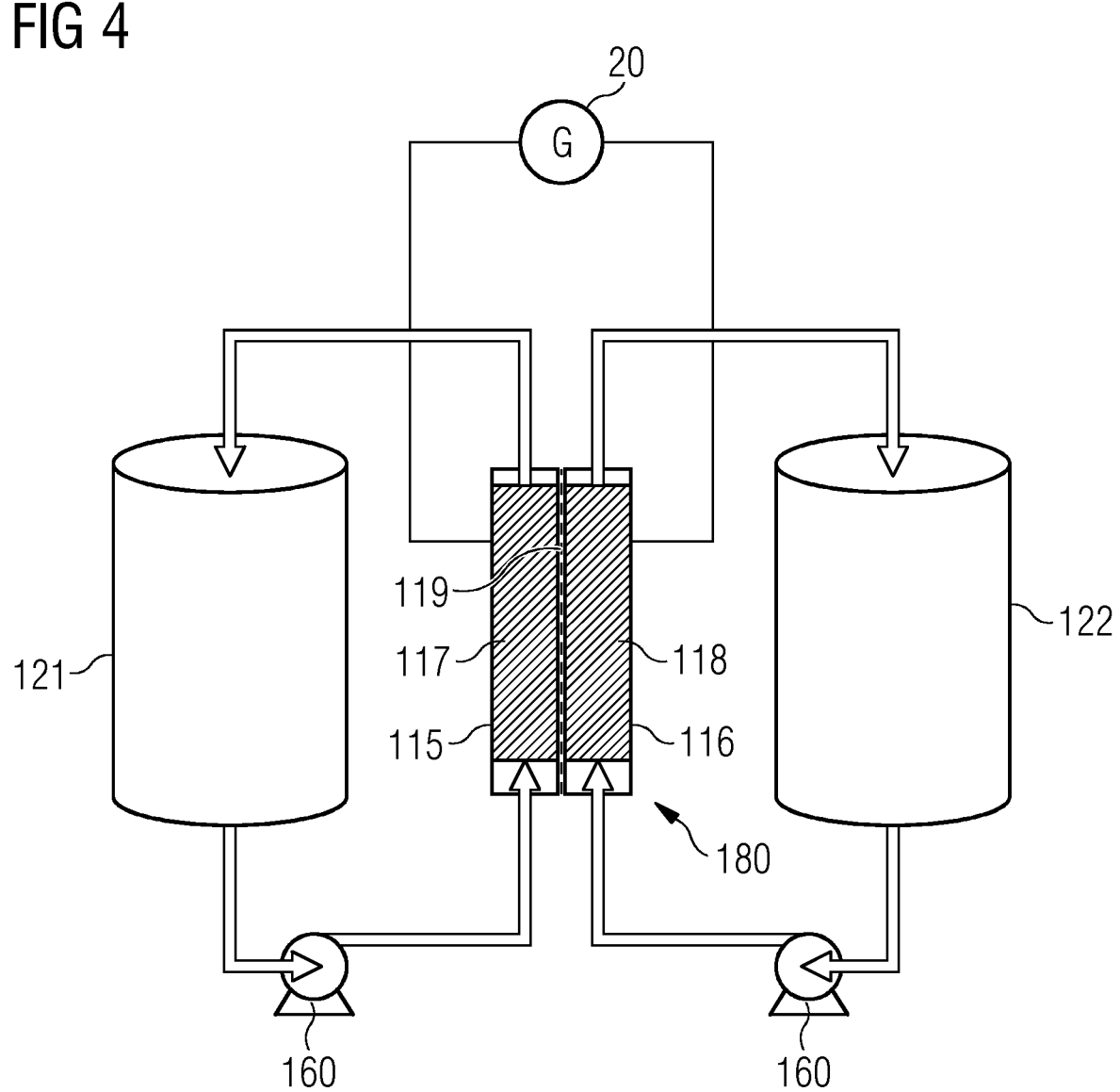
FIG. 4 is a schematic drawing showing an example of the general operation principle of a flow battery.

FIG. 4 illustrates the operation of such flow battery for a respective charging circuit in more detail. The electrochemical flow cell 180 includes two flow chambers that are separated by a membrane 119. Opposite the membrane 119, the chambers are bounded by respective electrodes 115, 116, to which the power generating device 20 is connected and provides electrical power. Each chamber further includes a porous electrode 117, 118 through which the respective electrolyte flows. The electrolyte is in particular pumped by pumps 160, one pump being provided for pumping the anolyte, the other for pumping the catholyte. The porous electrodes are electrically connected to the electrodes 115, 116, which may be considered to constitute current collectors. The membrane allows an ion exchange between the chambers, i.e., between the half cells, in order to prevent a build-up of charge in the respective half-cell.

In an embodiment, the flow battery is a redox flow battery that uses a change in oxidation states for storing and releasing electrical energy. A typical example is a vanadium redox battery that uses four different oxidation states of vanadium, two in the anolyte and two in the catholyte. It further uses carbon-based electrodes and a proton exchange membrane. The general operation and functioning of such redox flow batteries is known to the skilled person and thus not explained in greater detail here.

In an embodiment, the electrolyte, i.e., the anolyte and the catholyte, is an organic electrolyte. Several organic redox flow batteries have been developed and can be used with embodiments of the present invention. Using an organic electrolyte has the advantage that the risk of environmental pollution is reduced significantly. Furthermore, the materials used to dissolve the electrochemically active component are generally much less corrosive and dangerous to personnel than in conventional inorganic redox flow batteries, where sulphuric acid is for example used as a solvent. An organic redox flow battery may for example use water as a solvent.

The electrochemical cells employed in the discharging stack 130 may have a similar configuration but operate in the reverse way. In particular, the anolyte and catholyte undergo respective oxidation/reduction reactions leading to the accumulation of charges in the respective porous electrodes, which are collected by respective outer electrodes 115, 116. The chemical energy stored in the electrolyte is thus converted back to electric energy that is supplied towards the power grid. It should be clear that the charging stacks and the discharging stack can be connected fluidically in parallel to the anolyte tank 121 and the catholyte tank 122. Furthermore, in some embodiments, the anolyte tank 121 and the catholyte tank 122 may each be separated into two tanks, one collecting the de-energized electrolyte returned from the discharging stack 130, the de-energized electrolyte being supplied to the charging stacks 110. The other tank may collect the energized electrolyte received from the charging stacks 110 and may supply the energized electrolyte to the discharging stack 130. The efficiency of the battery system may thereby be increased.

Turning back to FIG. 1, it should accordingly be clear that each of the sets of flow conduits 140, 150 may comprise respective pipes for the supply and the return of the anolyte and the catholyte from the respective tank 121, 122. For the sake of simplicity, only one conduit is shown in the schematic drawings of FIGS. 1, 2 and 3, yet it should be clear that a return conduit is generally present for both the anolyte and the catholyte.

Each stack 110, 130 may comprise plural respective electrochemical cells 180 connected in parallel with respect to the flow of the electrolyte. Electrically, the cells of one stack are connected in series, so that a larger voltage is generated at the output of the stack or so that a larger voltage can be applied to the stack for energizing the electrolyte. Furthermore, depending on the power generation capacity, or on the power production capacity of the power plant 10, each charging stack 110 and/or the discharging stack 130 may include a cascade of respective stacks. In particular, a number of stacks can be connected electrically in series in order to achieve the desired voltage characteristics or a number of stacks may be connected in parallel in order to achieve the desired power take-off or power-producing capabilities.

For example, in a wind turbine application, the DC power generated by the rectifier may have a voltage of less than 1000 V, and the charging stack 110 may be configured to accept a respective voltage. The voltages in the wind turbine can thus be kept at relatively low voltage levels, so that safety measures can be simplified as well as the training of service staff.

As can be seen from FIG. 1, the power flow from the power generation devices 20 to the grid 50 occurs via the flow battery system, in particular via the energized electrolyte thereof. The generated energy can thus be transported via pipes, so that no medium or high-voltage cabling is required, which is generally associated with relatively high electrical power losses and with high costs. Furthermore, the power generation devices 20 and their associated charging stacks 110 may be located a significant distance away from the discharging stack 130 and the grid connection point 11. Only the flow conduits 140 or 150 need to be provided to cross such distance, depending on whether the central storage unit 100 is located at the location of the power generation devices 20 or of the discharging stack 130. Also, it is clear that the power grid 50 and the energy generation devices 20 are electrically completely decoupled, the central storage unit 120 providing a buffer for generated energy. Transients on the power grid 50, in particular spikes, or under-voltages, are thus not transferred to the power generation devices 20, and likewise, variations in the output power of the power generation devices 20 are not transferred to the power grid. By supplying the electrical energy from the storage tanks 121, 122 via the discharging stack 130, the power demand of the grid for active or reactive power can be easily met and compliance with the grid code is facilitated.

Figure 2:
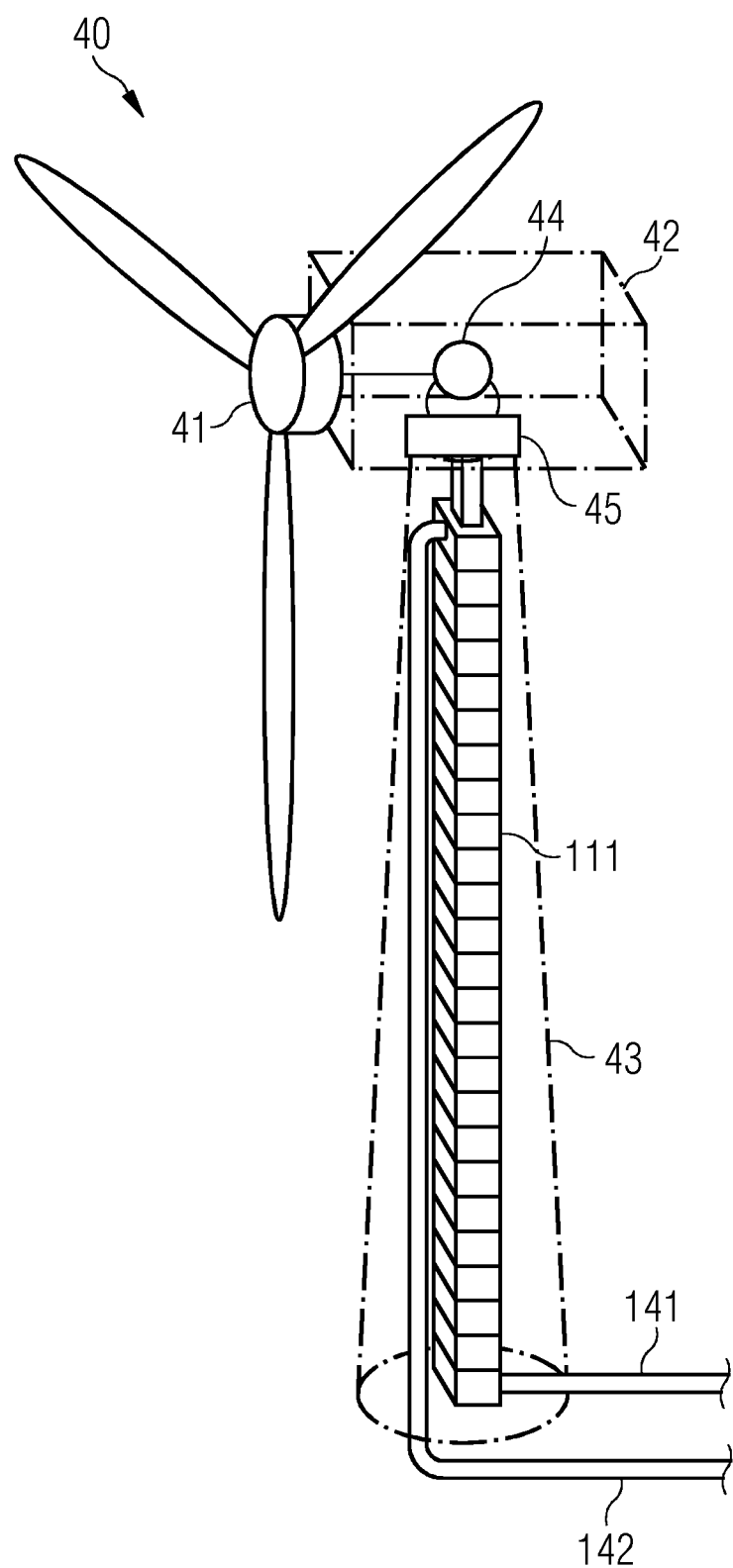
FIG. 2 is a schematic drawing showing a power generation device in form of a wind turbine according to an embodiment of the invention.

FIG. 2 illustrates an example in which the power generation device 20 is implemented as a wind turbine 40 comprising a rotor 41, a nacelle 42 and a wind turbine tower 43. In the example of FIG. 2, the associated charging stack 111 is provided inside the tower 43 of the wind turbine 40. The space inside the tower can thus be used efficiently and the charging stack 111 is protected from environmental influences. In other embodiments, the charging stack 111 may be arranged directly adjacent to the wind turbine 40, for example in a container disposed in proximity to the tower 43. In any case, electrical losses due to electrical power transmission can be kept low.

The charging stack 111 is connected via flow conduit 141 to the anolyte tank 121 and via flow conduit 142 to the catholyte tank 122. It should be clear that each of these conduits include a supply line and a return line for the anolyte and the catholyte, respectively. As can be seen, the charging stack 111 can include a significant number of stacked electrochemical cells 180, so that the stack 111 can accept a relatively high voltage. The charging stack may for example include more than 10, more than 20, or even more than 30 electrochemical cells.

The rotor 41 turns directly or indirectly a generator 44 which provides generated electric power to a rectifier 45. The output of the rectifier is connected to the charging stack 111. Rectifier and charging stack 111 are matched to each other so that the desired DC voltage is applied to the charging stack 111. Accordingly, a very simple electrical setup is achieved with a reduced number of components; in particular, the setup does not require an inverter in the wind turbine or a wind turbine transformer.

The power generation plant 10 may comprise plural such wind turbines 40 with respective associated charging stacks 110.

Figure 3:
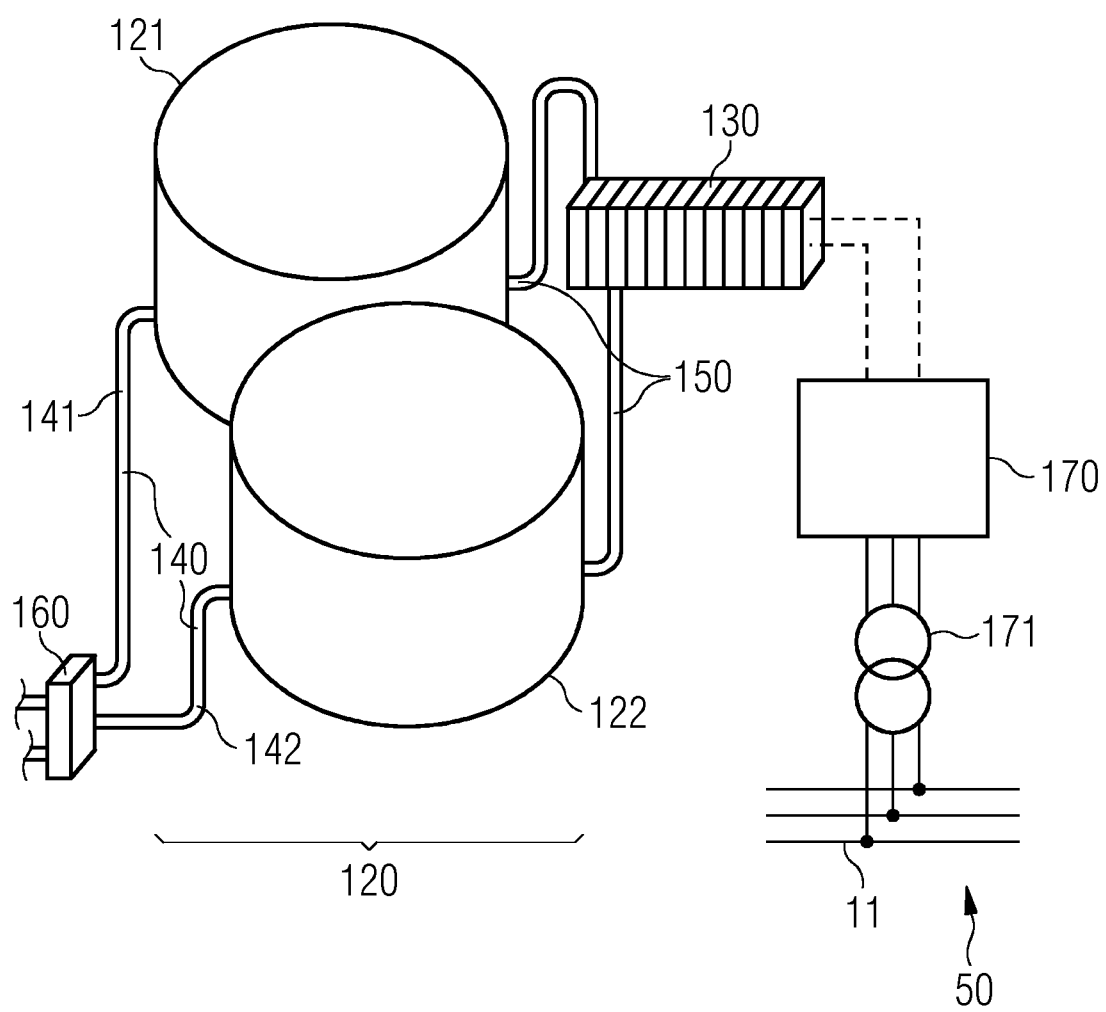
FIG. 3 is a schematic drawing showing a central storage unit and a discharging stack in accordance with an embodiment of the invention.

FIG. 3 shows the central storage unit 120 in more detail. The two tanks 121, 122 are placed adjacent to each other, and a pump 160 is provided for pumping the anolyte and the catholyte towards the respective charging stacks. It should be clear that separate pumps can be provided for each line, and that the flow conduits 140 also include respective return lines (not shown).

The central storage unit 120 may comprise respective pumps (not shown) for pumping the anolyte and the catholyte through the second set of flow conduits 150 towards the discharging stack 130. For operating the pumps, the central storage unit 120 may be provided with photovoltaic cells, which can be disposed on top of the tanks 121, 122. The self-consumption of the redox flow battery system can thus be covered at least partially.

The discharging stack 130 is electrically connected to a converter 170, in particular to an inverter that generates from the DC voltage produced by the discharging stack 130 an AC voltage of desired frequency, in particular the frequency required for feeding power into the power grid 50. These are generally 50 or 60 Hz, depending on the power grid. The converted electrical power is then transformed by a transformer 171, the output of which is connected to the power grid 50 at the grid connection point 11. The converter 170 and the transformer 171 may form part of the energy transmission system 100. It should be clear that the converter 170 can be configured so as to be operable both as an inverter or a rectifier. A respective control unit can be provided that controls operation of the converter 170. For example, the converter 170 can be operated as a rectifier such that the flow battery system is charged from the power grid through the discharging stack 130, which then operates so as to energize the electrolyte to thereby charge the flow battery system.

The number of power conversion and transformation equipment in the energy transmission system 100 and the power plant 10 can thus be kept quite low, which reduces complexity and cost. Also, the losses due to electrical energy conversion and transformation are significantly lower.

FIG. 5 illustrates a method according to an embodiment of the invention. In step 501, electrical energy is generated at distributed power generation devices 20, such as wind turbines or photovoltaic modules. The generated energy is converted into chemical energy by charging stacks 110 in step 502 at each power generation device or group of power generation devices. A single charging stack 110 may for example provide conversion of electrical energy for a row of photovoltaic modules. The energy is in particular stored in chemical form in the electrolyte flowing through the charging stacks. In step 503, the energy is transported from the charging stacks to a central storage unit 120 by the energized electrolyte. This occurs by operation of pumps 160. Again, by the operation of respective pumps 160, the energy is transported from the central storage unit to the discharging stack by the energized electrolyte in step 504. The discharging stack converts in step 505 the chemical energy that is stored in the energized electrolyte into electrical energy. As mentioned with respect to FIG. 4, the electrical energy is collected by respective electrodes on which the charges released in the redox reaction collect. The converted electrical energy is then fed into the power grid in step 506. This may involve the conversion of the electrical energy from DC to AC by the inverter 170 and transformation to the desired voltage level by the transformer 171. It should be clear that steps 501 to 506 can be performed continuously during the operation of the power plant 10 and the energy transmission system 100.

As mentioned above, the energy transmission system 100, or parts thereof, can also be operated the reverse way. As a respective electrochemical cell can be used both for charging and discharging the flow battery system, the charging stacks 110 can be used in a reverse mode for providing electrical energy to the power generation devices 20. This is beneficial in cases where the power generation devices 20 need to be black-started, for example wind turbines connected to an island network. Black-starting means the powering-up of the essential systems of the wind turbine and the bringing of the wind turbine into an operating mode in which it is capable of capturing wind energy and converting this mechanical energy into electrical energy. Similarly, the discharging stack 130 can be used in a reverse operation mode in which it extracts energy from the power grid 50, for example to absorb spikes, and stores the extracted energy in the central storage unit 120 by energized electrolyte.

The power generation devices, in particular wind turbines, and the flow battery system are thus merged into one system that creates significant advantages over conventional power plants. Besides black-start capability and the capability to support weak grids, the system requires significantly less components for electrical power conversion and transformation, and furthermore avoids the electrical losses associated with transport of electrical power via medium voltage cables. Cable losses from a wind farm grid can thereby be avoided. As the central storage system 120 acts as a buffer between the grid and the power generation devices, a higher energy yield may be achieved since the voltage level and frequency of the generated power do not need to be matched the grid requirements. Likewise, the power demand curve of the power grid can be followed easily. Besides the capability of optimizing the stacks 110, 130 for charging and discharging, respectively, the system has further advantages, such as reducing the costs for providing the connection to an offshore wind farm, which can be provided in form of simple pipes instead of the expensive medium voltage subsea cabling.

In the example of FIGS. 2 and 3, the wind turbine of FIG. 2 may for example be an offshore wind turbine, whereas the central storage unit 120 and the discharging stack 130 may be located onshore. Accordingly, only a pipe connection has to be provided between the offshore and the onshore site, removing the need for expensive medium voltage subsea-cables.

It should be clear that the system may comprise further components not shown, such as switchgears and circuit breakers for disconnecting the equipment from the power grid, and the like. The energy transmission system may for example comprise a controller, which can include a wind farm controller, a flow battery controller or both. Each such controller may be implemented by a microprocessor, memory (RAM, ROM, flash memory, hard disc drive and the like) and associated input/output interfaces. Control instructions stored in the memory may be executed by the microprocessor and may cause the controller to perform any of the methods described herein. The controller may control wind turbine 40 and/or rectifier 45 so that produced electrical energy is provided to the charging stack to charge the flow battery system. It may further control the converter 170 such that electrical energy generated by the discharging stack 130 is converted and fed into the power grid. The controller may also be configured to control the power transmission system such that the charging stack generates electrical power that is provided to an associated wind turbine for black starting the wind turbine. The controller may further be configured to operate the converter 170 as a rectifier so as to charge the flow battery system from the power grid 50 through the converter 170. The respective control may be implemented by the above-mentioned control instructions.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An energy transmission system for a power generation plant that comprises plural distributed power generation devices, wherein the energy transmission system includes a flow battery system comprising:
   plural charging stacks including electrochemical flow cells, wherein each charging stack is associated with one or a group of the plural distributed power generation devices of the power generation plant, wherein the charging stacks are arranged at or inside the respective associated power generation devices, wherein the plural charging stacks are distributed across the power generation plant, and wherein each charging stack is configured to receive electrical energy produced by the associated power generation device or group of power generation devices and to energize an electrolyte of the flow battery system at the location of the associated one or group of power generation devices by the received electrical energy;
   a central storage unit configured to store the electrolyte of the flow battery system,
   a discharging stack including electrochemical flow cells, wherein the discharging stack is configured to extract electrical energy from the electrolyte and to provide the electrical energy to a power grid;
   a first set of flow conduits configured to provide a flow connection from the plural distributed charging stacks to the central storage unit in order to provide transmission of energy produced by the plural distributed power generation devices to the central storage unit by a flow of the energized electrolyte; and a second set of flow conduits that provide a flow connection from the central storage unit to the discharging stack in order to provide transmission of energy from the central storage unit to the discharging stack by a flow of the energized electrolyte.

2. The energy transmission system according to claim 1, wherein the plural charging stacks are arranged at the power generation plant and wherein the central storage unit and the discharging stack are arranged remote from the power generation plant.

3. The energy transmission system according to claim 1, wherein at least one, each, of the plural charging stacks is arranged inside a power generation device.

4. The energy transmission system according to claim 3, wherein the power generation devices are wind turbines, wherein at least one, each, of the plural charging stacks is arranged inside a tower of the associated wind turbine.

5. The energy transmission system according to claim 1, wherein the power generation plant is an offshore power generation plant, wherein the plural charging stacks are arranged offshore at the offshore power generation plant and wherein the discharging stack is arranged onshore.

6. The energy transmission system according to claim 5, wherein at least one of the charging stacks are arranged on an offshore platform.

7. The energy transmission system according to claim 1, wherein the first set of flow conduits provides a main transmission route, the only transmission route, for energy produced by the power generation devices of the power generation plant to the power grid.

8. The energy transmission system according to claim 1, wherein the central storage unit comprises pumps to pump the electrolyte from the central storage unit to the plural charging stacks, wherein, the central storage unit further comprising photovoltaic modules coupled to the pumps to provide electrical energy for driving the pumps.

9. The energy transmission system according to claim 1, further comprising a controller, the controller being configured to control the feeding of electrical power into the power grid via the discharge stack, wherein the controller is further configured to control the energy transmission system so as to enable the flow battery system to absorb electrical power from the grid via the discharging stack.

10. The energy transmission system according to claim 1, further comprising an inverter coupled to the output of the discharging stack to convert DC electrical power supplied by the discharging stack into AC electrical power, and a transformer configured to adapt a voltage of the AC electrical power to a voltage suitable for transmission via the power grid.

11. The energy transmission system according to claim 1, wherein the electrolyte is an organic electrolyte, and is in particular a salt water-based electrolyte.

12. A wind farm comprising plural power generation devices in form of wind turbines and an energy transmission system according to claim 1.

13. The wind farm according to claim 12, wherein each wind turbine comprises a generator and a rectifier coupled to the generator, wherein the wind turbine is configured to provide electrical energy generated by the generator via the rectifier to the associated charging stack.

14. A power generation device, wherein the power generation device is a wind turbine, wherein the power generation device comprises:
a charging stack forming part of a flow battery system and including electrochemical flow cells, wherein the charging stack is configured to receive electrical energy produced by the power generation device and to energize an electrolyte of the flow battery system by the received electrical energy; and
a tower, wherein the charging stack is arranged inside the tower.

15. The power generation device according to claim 14, wherein the power generation device further comprising flow conduits configured to provide a flow connection from the charging stack towards a central storage unit configured to store the electrolyte of the flow battery system in order to provide transmission of energy produced by the power generation device to the central storage unit by a flow of the energized electrolyte.

16. The power generation device according to claim 14, wherein the wind turbine comprises a generator and a rectifier coupled to the generator, wherein the wind turbine is configured to provide electrical energy generated by the generator via the rectifier to the charging stack.

17. A method of operating an energy transmission system for a power generation plant that comprises plural distributed power generation devices, wherein the energy transmission system includes a flow battery system, wherein the method comprises:
receiving electrical energy at plural charging stacks that include electrochemical flow cells, wherein each charging stack is associated with one or a group of the plural distributed power generation devices of the power generation plant, wherein the charging stacks are arranged at or inside the respective associated power generation devices, wherein the plural charging stacks are distributed across the power generation plant, the electrical energy being received by each charging stack from the associated power generation device or group of power generation devices, and energizing, by the charging stacks at the location of the associated one or group of power generation devices, an electrolyte of the flow battery system by the received electrical energy;
transmitting the energy produced by the power generation devices to a central storage unit by flowing the energized electrolyte through a first set of flow conduits that provide a flow connection from the plural charging stacks to the central storage unit, the electrolyte being stored at the central storage unit;
transmitting energy from the central storage unit to a discharging stack by flowing energized electrolyte through a second set of flow conduits that provide a flow connection from the central storage unit to the discharging stack;
extracting electrical energy from the electrolyte by the discharging stack that includes electrochemical flow cells; and
providing the extracted electrical energy to a power grid.

* * * * *